US011946146B2

(12) United States Patent
Keshavan et al.

(10) Patent No.: US 11,946,146 B2
(45) Date of Patent: Apr. 2, 2024

(54) COATING SYSTEMS INCLUDING INFILTRATION COATINGS AND REACTIVE PHASE SPRAY FORMULATION COATINGS

(71) Applicant: General Electric Company, Schenectady, NY (US)

(72) Inventors: Hrishikesh Keshavan, Watervliet, NY (US); Bernard Patrick Bewlay, Niskayuna, NY (US); Jose Sanchez, Niskayuna, NY (US); Margeaux Wallace, Niskayuna, NY (US); Byron Pritchard, Cincinnati, OH (US); Ambarish Kulkarni, Glenville, NY (US)

(73) Assignee: General Electric Company, Schenectady, NY (US)

(*) Notice: Subject to any disclaimer, the term of this patent is extended or adjusted under 35 U.S.C. 154(b) by 148 days.

(21) Appl. No.: 17/329,326

(22) Filed: May 25, 2021

(65) Prior Publication Data

US 2021/0277523 A1 Sep. 9, 2021

Related U.S. Application Data

(62) Division of application No. 16/208,605, filed on Dec. 4, 2018, now Pat. No. 11,028,486.

(51) Int. Cl.

| | |
|---|---|
| ***C23C 28/04*** | (2006.01) |
| ***C23C 18/12*** | (2006.01) |
| ***F01D 5/28*** | (2006.01) |

(52) U.S. Cl.

CPC ........ *C23C 28/042* (2013.01); *C23C 18/1216* (2013.01); *C23C 18/1295* (2013.01); *F01D 5/288* (2013.01); *F05B 2220/30* (2013.01); *F05B 2280/6011* (2013.01); *F05D 2230/90* (2013.01)

(58) Field of Classification Search

CPC .................................................... C23C 28/042

See application file for complete search history.

(56) References Cited

U.S. PATENT DOCUMENTS

| | | | |
|---|---|---|---|
| 2,922,721 | A | 1/1960 | Tarkan et al. |
| 5,366,686 | A | 11/1994 | Mortensen et al. |
| 5,509,555 | A | 4/1996 | Chiang et al. |

(Continued)

FOREIGN PATENT DOCUMENTS

| | | | |
|---|---|---|---|
| EP | 1788122 | A1 | 5/2007 |
| EP | 1793011 | A2 | 6/2007 |
| EP | 2128299 | A1 | 12/2009 |

*Primary Examiner* — Robert A Vetere

(74) *Attorney, Agent, or Firm* — Dority & Manning, P.A.

(57) ABSTRACT

A coating system configured to be applied to a thermal barrier coating of an article includes an infiltration coating configured to be applied to the thermal barrier coating. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The coating system also includes a reactive phase spray formulation coat configured to be applied to the thermal barrier coating. The reactive phase spray formulation coating reacts with dust deposits on the thermal barrier coating.

14 Claims, 6 Drawing Sheets

(56) References Cited

U.S. PATENT DOCUMENTS

| | | | |
|---|---|---|---|
| 5,520,880 | A | 5/1996 | Johnson et al. |
| 6,228,453 | B1 | 5/2001 | Fareed et al. |
| 6,465,090 | B1 * | 10/2002 | Stowell .................. C04B 41/52 428/323 |
| 6,582,779 | B2 | 6/2003 | Li et al. |
| 6,627,323 | B2 | 9/2003 | Nagaraj et al. |
| 6,720,038 | B2 | 4/2004 | Darolia et al. |
| 8,216,689 | B2 | 7/2012 | Witz et al. |
| 9,194,242 | B2 | 11/2015 | Lee |
| 9,701,578 | B2 | 7/2017 | Chamberlain |
| 9,869,188 | B2 | 1/2018 | Brosnan et al. |
| 2007/0116883 | A1 * | 5/2007 | Gorman ............. C23C 28/3455 427/446 |
| 2009/0079110 | A1 | 3/2009 | Gueguen et al. |
| 2012/0231211 | A1 | 9/2012 | Von Niessen et al. |
| 2016/0040299 | A1 | 2/2016 | Allemand et al. |
| 2016/0168684 | A1 | 6/2016 | Brosnan et al. |
| 2016/0347671 | A1 | 12/2016 | Strock |
| 2017/0165708 | A1 | 6/2017 | Sivaramakrishnan et al. |
| 2018/0119270 | A1 | 5/2018 | Hoel et al. |

* cited by examiner

COATING SYSTEMS INCLUDING INFILTRATION COATINGS AND REACTIVE PHASE SPRAY FORMULATION COATINGS

PRIORITY INFORMATION

The present application claims priority to and is a divisional application of U.S. patent application Ser. No. 16/208,605 filed on Dec. 4, 2018, which is incorporated by reference herein in its entirety for all purposes.

FIELD

The subject matter described herein relates to reactive coatings.

BACKGROUND

Coatings are extensively used in turbine engines, such as aircraft engines and industrial gas turbines, in order to protect various surfaces of the turbine engine when the turbine engine is operating. One example of a coating is a thermal barrier coating. Coatings may often degrade during service of the turbine engine by spallation, damage, or the like. Spallation may also be caused by the build up of dust and calcia-magnesium-silica (CMAS) deposits on the thermal barrier coating that may infiltrate and compromise the thermal barrier coating.

BRIEF DESCRIPTION

In one embodiment, a method includes applying an infiltration coating on a thermal barrier coating of an article. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The method also includes applying a reactive phase spray formulation coating on the thermal barrier coating. The reactive phase spray formulation coating reacts with dust deposits on the thermal barrier coating.

In one embodiment, a coating system configured to be applied to a thermal barrier coating of an article includes an infiltration coating configured to be applied to the thermal barrier coating. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The coating system also includes a reactive phase spray formulation coat configured to be applied to the thermal barrier coating. The reactive phase spray formulation coating reacts with dust deposits on the thermal barrier coating.

In one embodiment, a method includes depositing an infiltration coating on a thermal barrier coating of an article. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The method also includes depositing a reactive phase spray formulation coating on the thermal barrier coating. The reactive phase spray formulation coating includes a base material and a binder material.

The base material has a compliance that is higher than a compliance of the binder material. The binder material has a cohesive strength that is greater than a cohesive strength of the base material. The binder material has an adhesive strength that is greater than an adhesive strength of the base material. The binder material has a surface area of at least ten square meters per gram that is greater than a surface area of the base material. The infiltration coating and the reactive phase spray formulation coating are configured to reduce an amount of spalling of the thermal barrier coating relative to one or more of the infiltration coating or the reactive phase spray formulation coating not being deposited on the thermal barrier coating.

In one embodiment, a system includes an article including a thermal barrier coating and a coating system deposited on the thermal barrier coating of the article. The coating system includes an infiltration coating configured to be deposited on the thermal barrier coating. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The coating system also includes a reactive phase spray formulation coating configured to be deposited on the thermal barrier coating. The reactive phase spray formulation coating reacts with dust deposits on the thermal barrier coating. The infiltration coating and the reactive phase spray formulation coating are configured to reduce an amount of spalling of the thermal barrier coating relative to one or more of the infiltration coating or the reactive phase spray formulation coating not being deposited on the thermal barrier coating.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
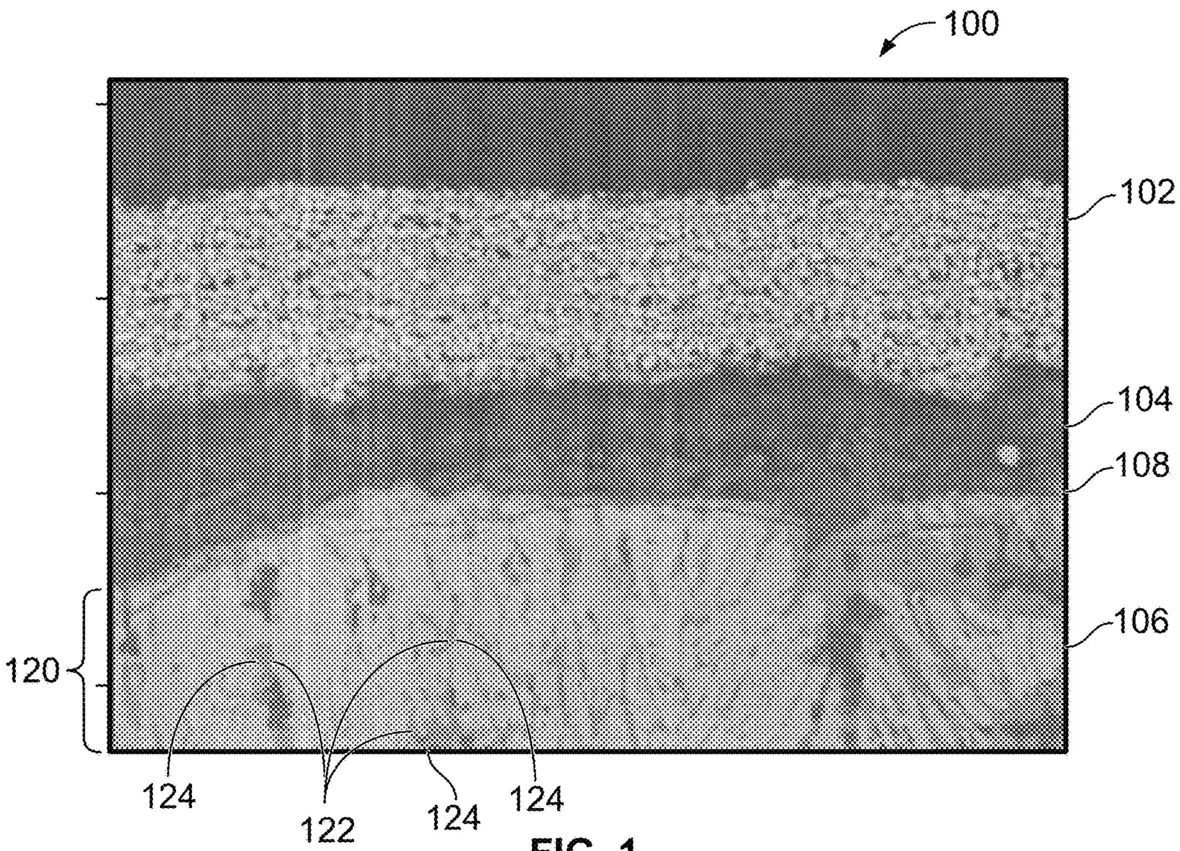
FIG. 1 illustrates a cross-sectional view of a coating system in accordance with one embodiment.

One or more embodiments of the inventive subject matter described herein provide coating systems which can increase the life of thermal barrier coatings. Specifically, one or more embodiments provide an infiltration coating procedure followed by the application of a reactive phase formulation coating onto the thermal barrier coatings. The infiltration coating is applied onto the thermal barrier coating as a liquid solution and penetrates the thermal barrier coating to infiltrate some pores of the bulk of the thermal barrier coating to change the porosity of the thermal barrier coating. The liquid solution is then decomposed to form solid oxide particles that coat the pores of the thermal barrier coating and again change the porosity of the thermal barrier coating. The reactive phase spray formulation coating is subsequently applied onto the thermal barrier coating and is suspended or remains on an outer surface of the thermal barrier coating.

The combination of the infiltration coating that treats the bulk of the thermal barrier coating and the reactive phase spray formulation coating that treats the surface of the thermal barrier coating improves the life of the thermal barrier coating. The combination coating treatment improves the reduction of damage that can occur to components having thermal barrier coatings when dust deposits on the thermal barrier coating infiltrate into the porous structure and cause spallation.

In one or more embodiments, the reactive phase formulation coating consists of a combination of large ceramic particles (e.g., particles that have a size from 1-10 microns) together with very fine ceramic particles (e.g., particles that have a size less than 1 micron). The very fine ceramic particles function as a binder for the large ceramic particles. The combination of the large and fine ceramic particles can be adjusted to provide preferred combinations of the following properties: adhesive strength, cohesive strength, and compliance.

Dust deposits and/or calcia-magnesium-silica (CMAS) deposits form layers on the thermal barrier coatings during operation of a system, such as a turbine engine. The dust deposits infiltrate the thermal barrier coating and degrade and/or damage the thermal barrier coating during service of the turbine engine. To address one or more of these problems, one embodiment of the subject matter described herein includes a coating system including the use of a chemical infiltration procedure to generate an infiltration coating followed by the application of a reactive phase spray formulation coating on the existing thermal barrier coating.

In one or more embodiments, the reactive phase spray formulation coating may include a base material (e.g., large ceramic particles) and a binder material (e.g., fine ceramic particles). The base material has a base compliance that is higher than a binder compliance of the binder material. The binder material has a cohesive strength that is greater than a cohesive strength of the base material. The binder material also has an adhesive strength that is greater than an adhesive strength of the base material. The particles of the binder material also have a surface area of at least ten (10) square-meters per gram (m2/g) that is greater than a surface area of the particles of the base material. The formulation or combination of the base material and the binder material is applied or deposited onto the thermal barrier coating of an article (e.g., a surface of a turbine engine) in order to form the reactive phase spray formulation coating on the thermal barrier coating of the article.

The binder material improves a cohesive strength level of the reactive phase spray formulation coating, improves an adhesive strength level of the reactive phase spray formulation coating, and improves a compliance of the reactive phase spray formulation coating of the thermal barrier coating relative to the reactive phase spray formulation coating not including the binder material.

The combination of the application of the infiltration coating followed by the application of the reactive phase spray formulation coating has provided new and unexpected results. At least one technical effect of the subject matter described herein includes improving the life of the thermal barrier coating without removal of the turbine engine from a wing of an aircraft, or in a land-based gas turbine installation, relative to the coating system not applying one of the infiltration coating or the reactive phase spray formulation coating. Another technical effect of the subject matter described herein includes improving the reduction of component damage, improving the reduction of repair and/or replacement costs, or improving the time between outages of the turbine engine, relative to the coating system not including applying one of the infiltration coating or the reactive phase spray formulation coating onto a thermal barrier coating. Another technical effect of the subject matter described herein includes improving an adhesive strength level of the reactive phase spray formulation coating to the thermal barrier coating without any thermal treatment or thermal processes.

Figure 2:
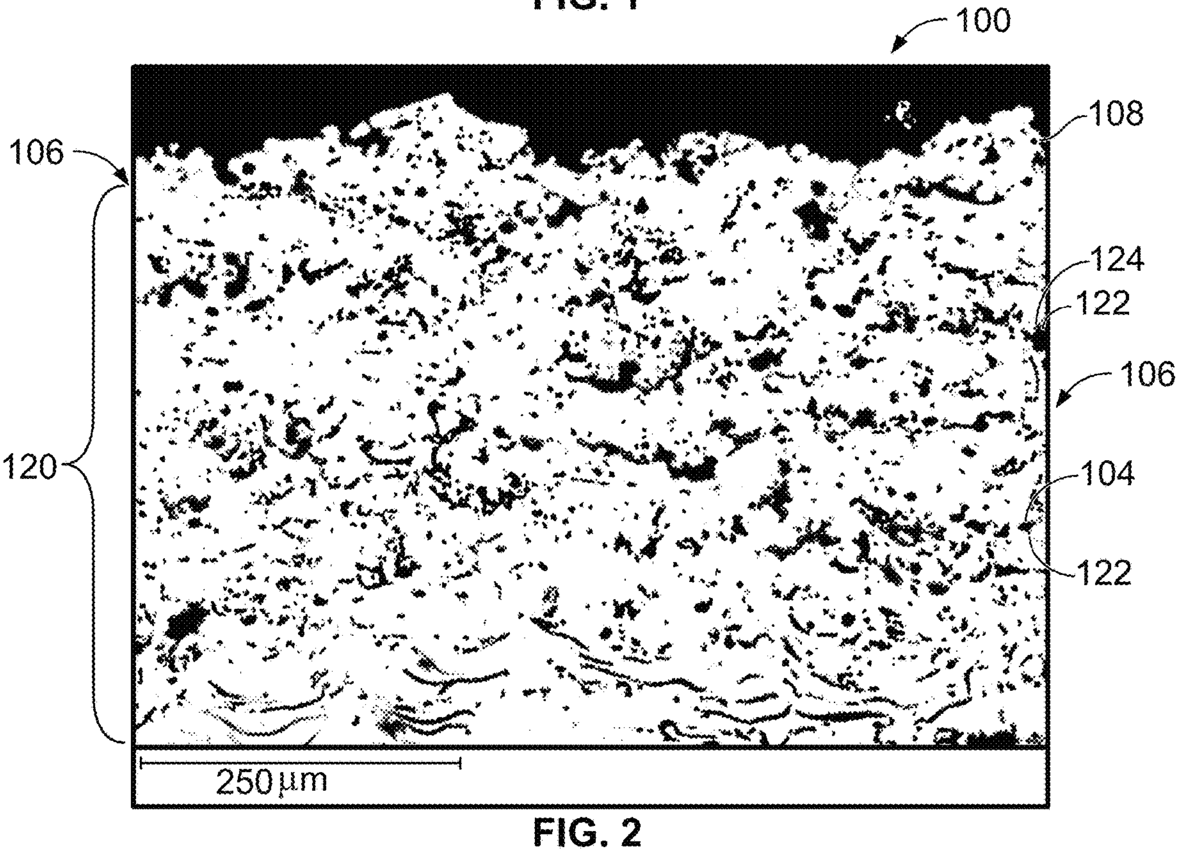
FIG. 2 illustrates a magnified cross-sectional view of part of the coating system 100 of FIG. 1 in accordance with one embodiment.

FIG. 1 illustrates a cross-sectional view of a coating system 100 in accordance with one embodiment. FIG. 2 illustrates a magnified cross-sectional view of part of the coating system 100 of FIG. 1 in accordance with one embodiment. The coating system 100 includes an infiltration coating 122 and a reactive phase spray formulation coating 102 that are applied to a thermal barrier coating 106 of an article (not shown). In one embodiment, the article may be a surface of a turbine engine, and the thermal barrier coating 106 may be a ceramic thermal barrier coating, a ceramic coating, or the like, that is applied to one or more surfaces of the turbine engine. The coating system 100 may be applied on the thermal barrier coating 106 of a new part (e.g., a new component of a turbine engine), on the thermal barrier coating 106 of a repaired part (e.g., an existing and/or used component of the turbine engine), may be applied on the repaired part in the field or at a maintenance location, or the like. In one or more embodiments, the thermal barrier coating 106 may be applied by a physical vapor deposition (PVD) method, or the like. Additionally or alternatively, the thermal barrier coating 106 may be deposited onto the article by one or more processes, such as, but not limited to, air plasma sprays (APS), electron beam-physical vapor deposition (EBPVD), directed vapor deposition (DVD), suspension plasma spray (SPS), or the like.

The thermal barrier coating 106 includes a top or outer surface 108 and a bulk 120 of the thermal barrier coating 106 extends a distance away from the outer surface 108 toward the article (not shown). The bulk 120 of the thermal barrier coating 106 includes several pores 124 that are dispersed throughout the bulk 120 of the thermal barrier coating 106. The infiltration coating 122 is applied onto the outer surface 108 of the thermal barrier coating 106 as a liquid solution.

In one or more embodiments, the infiltration coating 122 may be, but is not limited to, an earth oxide, another oxide such as alumina, or the like. Optionally, the infiltration coating 122 may include aluminum nitrate, gadolinium aluminum nitrate, yttrium nitrate, tantalum ethoxide, strontium nitrate, or the like. The infiltration coating 122 penetrates into at least some of the pores 124 of the thermal barrier coating 106 from the outer surface 108 to a distance away from the outer surface 108. For example, the infiltration coating 122 may penetrate into open porosity of the bulk 120 and fill some of the pores 124 through one or more holes or cracks at the outer surface 108 of the thermal barrier coating 106. Alternatively, the infiltration coating 122 may not be able to fill other pores 124 that are closed off or closed porosity.

The thermal barrier coating 106 may have different porosity structures within the bulk 120 based on the process used to apply thermal barrier coating 106. For example, the thermal barrier coating 106 that is applied via the electron beam-physical vapor deposition process (EBPVD) may have a porosity structure that is different than the porosity structure of the thermal barrier coating 106 that is applied via a different process (e.g., physical vapor deposition process, air plasma spray process, directed vapor deposition process, suspension plasma spray process, or the like). The thermal barrier coating 106 applied via the EBPVD process may have a vertical or columnar architecture porosity structure such that the infiltration coating 122 fills pores 124 that extend generally in vertical columns between the bulk 120 and the outer surface 108. Alternatively, the thermal barrier coating 106 that is applied via the air plasma spray process may have a random porosity structure. For example, the infiltration coating 122 may be able to penetrate different pores 124 of the bulk 120 based on the process the thermal barrier coating 106 is applied to the article.

Subsequent to the liquid solution of the infiltration coating 122 penetrating at least some of the pores 124, the infiltration coating 122 is decomposed and the liquid solution is changed to solid oxide particles. For example, the coating decomposes when the liquid solution of the infiltration coating 122 breaks down to a different state of the infiltration coating 122. In one or more embodiments, the infiltration coating 122 is decomposed by heating the infiltration coating 122. For example, heat may be applied to the coating system 100 by a furnace, a heat gun, heat lamps or quartz lamps, a torch, or the like. Optionally, heat may be applied to the coating system 100 by operating one or more systems of the article. The infiltration coating 122 may be heated to a temperature of about 200° C., 350° C., 500° C., 1000° C., or within about 2% of the stated temperature values, to generate decomposition of the liquid solution to the solid oxide particles. In one or more embodiments, the infiltration coating 122 may be applied to one or more surfaces of an aircraft (e.g., on a wing, or the like), and the coating 122 may be decomposed by heat generated by operation of the engine during an engine start up cycle. In one or more embodiments, the liquid solution may be partially decomposed. For example, a portion of the liquid solution may decompose to solid oxide particles, and another portion of the liquid solution may not decompose. The decomposed solid oxide particles of the infiltration coating 122 coats the pores 124 of the thermal barrier coating 106. For example, the solid oxide particles of the infiltration coating 122 becomes integral with the thermal barrier coating 106.

As a result of the liquid solution decomposing to reactive solid oxides particles, a volume of the infiltration coating 122 within the bulk 120 of the thermal barrier coating 106 changes. For example, before the infiltration coating 122 is applied onto the thermal barrier coating 106, the thermal barrier coating 106 has an initial or first porosity having a first porosity value. The porosity value may also be referred to as the open pore volume of the bulk 120 of the thermal barrier coating 106. For example, a larger porosity value may mean that there are more pores (e.g., a larger number or percentage of pores), larger pores (e.g., in size, area, or the like), or a combination therein, relative to a thermal barrier coating 106 that has a smaller porosity value. As a result of the liquid solution of the infiltration coating 122 penetrating into at least some of the pores 124 of the thermal barrier coating 106, the liquid solution of the infiltration coating 122 reduces the porosity of the bulk 120 from the initial or first porosity value to a second porosity value that is less than the first porosity value. Subsequently, as a result of the liquid solution decomposing to the solid oxide particles, the solid oxide particles of the infiltration coating 122 reduce the porosity of the bulk 120 from the second porosity value to a third porosity value that is less than the second porosity value. For example, the liquid solution of the infiltration coating 122 fills a portion of the pores 124 of the thermal barrier coating 106, and the solid oxide particles of the decomposed infiltration coating 122 fills a portion of the pores 124 that is less than the portion filled by the liquid solution of the infiltration coating 122. For example, decomposing the infiltration coating 122 changes the volume of the infiltration coating 122 within the bulk 120 of the thermal barrier coating 106.

In one embodiment, the thermal barrier coating 106 may have an initial or first porosity value of about 25% porosity in the bulk 120 of the thermal barrier coating. The liquid solution of the infiltration coating 122 may occupy or fill about 40% of the available 25% of the available porosity of the bulk 120. For example, the liquid solution of the infiltration coating 122 may have a second porosity value of about 10% of the total porosity of the bulk 120 (e.g., may fill 0.4 of 25%). The decomposed solid oxide particles of the infiltration coating 122 may occupy or fill about 25% of the volume of the first porosity of the thermal barrier coating. For example, the solid oxide particles of the infiltration coating 122 may have a third porosity value of about 6% of the total porosity of the bulk 120 (e.g., of 25%). In one or more alternative embodiments, the liquid solution and/or the solid oxide particles may fill a different volume of the porosity of the thermal barrier coating 106.

The infiltration coating 122 may be applied onto the thermal barrier coating 106 in multiple operations to increase the amount of the infiltration coating 122 that penetrates into the bulk 120 of the thermal barrier coating 106. For example, the infiltration coating 122 may be sprayed onto the outer surface 108 in a series of plural, separate spraying or coating operations. Increasing the amount of coating 122 that penetrates the bulk 120 also increases the amount of the solid oxide particles that coat the pores 124 after the infiltration coating 122 decomposes. In one or more embodiments, the infiltration coating 122 may be applied, deposited, sprayed, or the like, onto the thermal barrier coating 106 with a cold and/or non-thermal process such as, but not limited to, a spray process, a slurry process, or the like.

Figure 3:
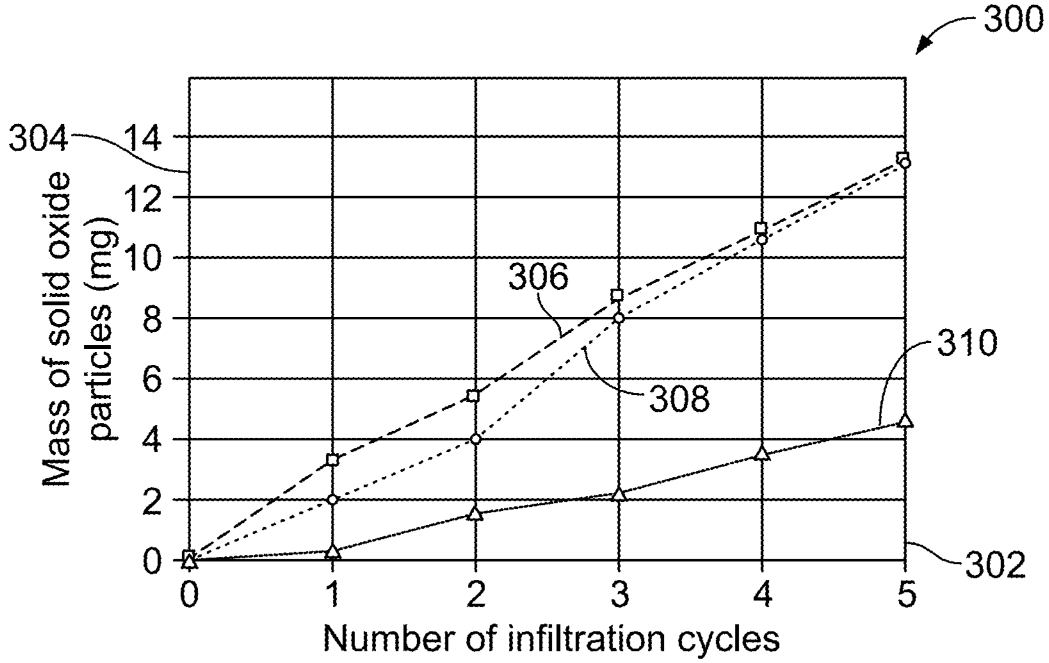
FIG. 3 illustrates a graph of an amount of infiltration coating penetrating a thermal barrier coating in accordance with one embodiment.

FIG. 3 illustrates a graph 300 of the mass or amount of the infiltrating coating 122 penetrated within the bulk 120 of the thermal barrier coating 106. A horizontal axis 302 illustrates increasing number of infiltration cycles, and a vertical axis 304 indicates an increasing mass of the solid oxide particles coated within the pores 124 of the bulk 120 of the thermal barrier coating 106. A data line 306 represents a first sample article including a new application of the thermal barrier coating that has been applied via the air plasma spray process. A data line 308 represents a second sample article including an aged or existing application of the thermal barrier coating that has been applied via the air plasma spray process. A data line 310 represents a third sample article including a new application of the thermal barrier coating that has been applied via the physical vapor deposition (PVD) process.

The thermal barrier coating applied via the PVD process results in the thermal barrier coating having a vertical or columnar architecture porosity structure, and the air plasma spray process results in the thermal barrier coating having a random porosity structure. As illustrated in the graph 300, the data line 310 of the third sample indicates that it takes a greater number of infiltration spray cycles to increase the mass of the solid oxide particles within the bulk 120 of the thermal barrier coating 106 relative to the first and second samples. Additionally, the data lines 306 and 308 indicate that the mass of the solid oxide samples remains relatively common regardless of the thermal barrier coating being a new application or an existing or old application.

In the illustrated embodiment of FIG. 1, a layer of dust deposits 104 are disposed between the thermal barrier coating 106 and the reactive phase spray formulation coating 102. For example, responsive to the turbine engine operating during a test cycle, operating cycle, service cycle, or the like, dust deposits may collect, form, or the like, on one or more surfaces of the turbine engine on the thermal barrier coating 106. Optionally, a layer of dust deposits 104 may not collect or may not have formed on the thermal barrier coating 106. Additionally or alternatively, a layer of calcia-magnesia-alumina-silica (CMAS) deposits may also collect, form, or the like, on the one or more surfaces of the turbine engine on the thermal barrier coating 106. After the infiltration coating 122 decomposes within the pores 124 of the thermal barrier coating 106, the reactive phase spray formulation coating 102 is applied to the thermal barrier coating.

Figure 4:
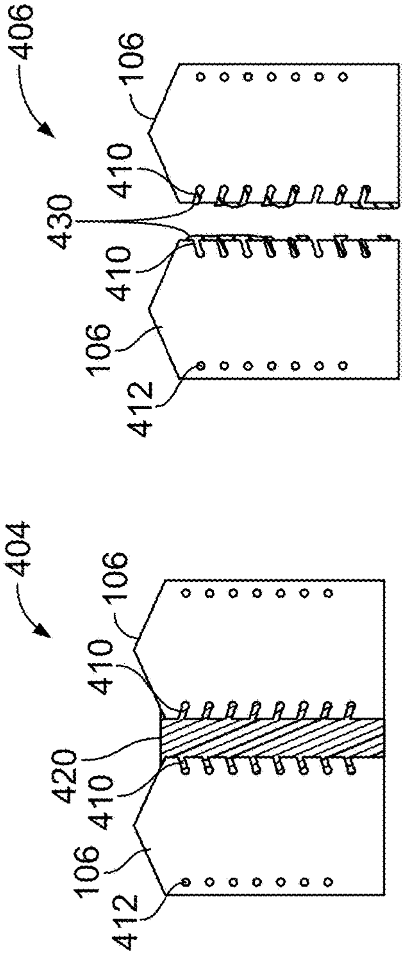
FIG. 4 illustrates an infiltration coating applied to a thermal barrier coating that has been applied via a physical vapor deposition process in accordance with one embodiment.

FIG. 4 illustrates one embodiment of the infiltration coating 122 applied to the thermal barrier coating 106 that has been applied via a physical vapor deposition process (PVD). For example, the thermal barrier coating 106 that is applied via the PVD process, such as the electron-beam physical vapor deposition (EBPVD) process, has a vertical or columnar architecture porosity structure. FIG. 4 is exaggerated for illustrative purposes only and is not drawn to scale. At 402, a magnified view of the thermal barrier coating 106 illustrates two columns of the coating 106. Open pores 410 extend substantially vertically between the two columns of the thermal barrier coating 106. The coating 106 also includes plural isolated pores 412 that are disposed throughout the thermal barrier coating 106. For example, the isolated pores 412 are separated from the open pores 410. In the illustrated embodiment, the open pores 410 account for about 75% of the porosity of the bulk of the thermal barrier coating 106, and the isolated pores 412 account for about 25% of the porosity of the bulk of the thermal barrier coating 106. Optionally, the thermal barrier coating 106 may have a porosity that is made of different percentages of open pores 410 and/or isolated pores 412.

In one or more embodiments, the thermal barrier coating 106 has a thickness from about a top, upper, or outer surface of the thermal barrier coating 106 to a distance away from the top or outer surface of about 50 microns, 100 microns, 200 microns, or the like. Each of the columns of the thermal barrier coating 106 may be from about 4 microns to 12 microns wide. For example, the width of each of the substantially vertical columns may be about 10 microns. Optionally, the width may be greater than or less than 10 microns wide. Additionally, the gap of the open pores 410 between two of the substantially vertical columns may be about 1 micron, 2 microns, 4 microns, or the like, wide. For example, the width of the open pores 410 between two columns of the thermal barrier coating 106 may be less than 1 micron wide, may be between 1 and 2 microns wide, may be wider than 2 microns, or the like. Optionally, one or more of the thermal barrier coating columns and/or gaps between the columns may have any alternative size.

At 404, a liquid solution 420 of the infiltration coating is applied onto the thermal barrier coating 106. The liquid solution 420 infiltrates the open pores 410 of the thermal barrier coating 106 along the substantially vertical columnal structure of the thermal barrier coating 106. The liquid solution 420 infiltrates a portion of the porosity of the thermal barrier coating to change the porosity value of the thermal barrier coating. For example, the liquid solution 420 infiltrates the open pores 410 but does not infiltrate the isolated pores 412 of the thermal barrier coating 106.

At 406, the liquid solution 420 decomposes to form solid oxide particles 430 of the infiltration coating. The solid oxide particles 430 coat the open pores 410 of the thermal barrier coating 106. For example, the solid oxide particles 430 cover one or more surfaces of the open pores 410 to become integral with the thermal barrier coating 106. In one or more embodiments, the solid oxide particles 430 may cover or coat about or less than 20% of the width of the gap of the open pores 410 between two of the substantially vertical columns of the thermal barrier coating 106 and coat about or less than 10% of the wall of the columns. For example, the solid oxide particles 430 may only coat a portion of the open pores 410 to prevent increasing of an in-plane shear modulus of the thermal barrier coating 106. In one or more embodiments, the solid oxide particles 430 may coat about 100 to 250 nano-meters of the open pores 410 of the thermal barrier coating 106. The steps 402, 404, 406 may be repeated any number of times with a number of infiltration application cycles to increase the volume of the solid oxide particles 430 of the infiltration coating that is infiltrated into the open pores 410 of the thermal barrier coating 106.

The solid oxide particles 430 change the porosity of the thermal barrier coating 106 relative to the porosity of the thermal barrier coating 106 changed by the liquid solution 420 of the infiltration coating. For example, the thermal barrier coating 106 has a first porosity value prior to the liquid solution 420 of the infiltration coating infiltrating the open pores 410. The liquid solution 420 reduces the porosity of the bulk of the thermal barrier coating 106 from the first porosity value to a second porosity value that is less than the first porosity value. Subsequently, decomposing the infiltration coating to the solid oxide particles 430 reduces the porosity of the bulk of the thermal barrier coating 506 from the second porosity value to a third porosity value that is less than the second porosity value.

Figure 5:
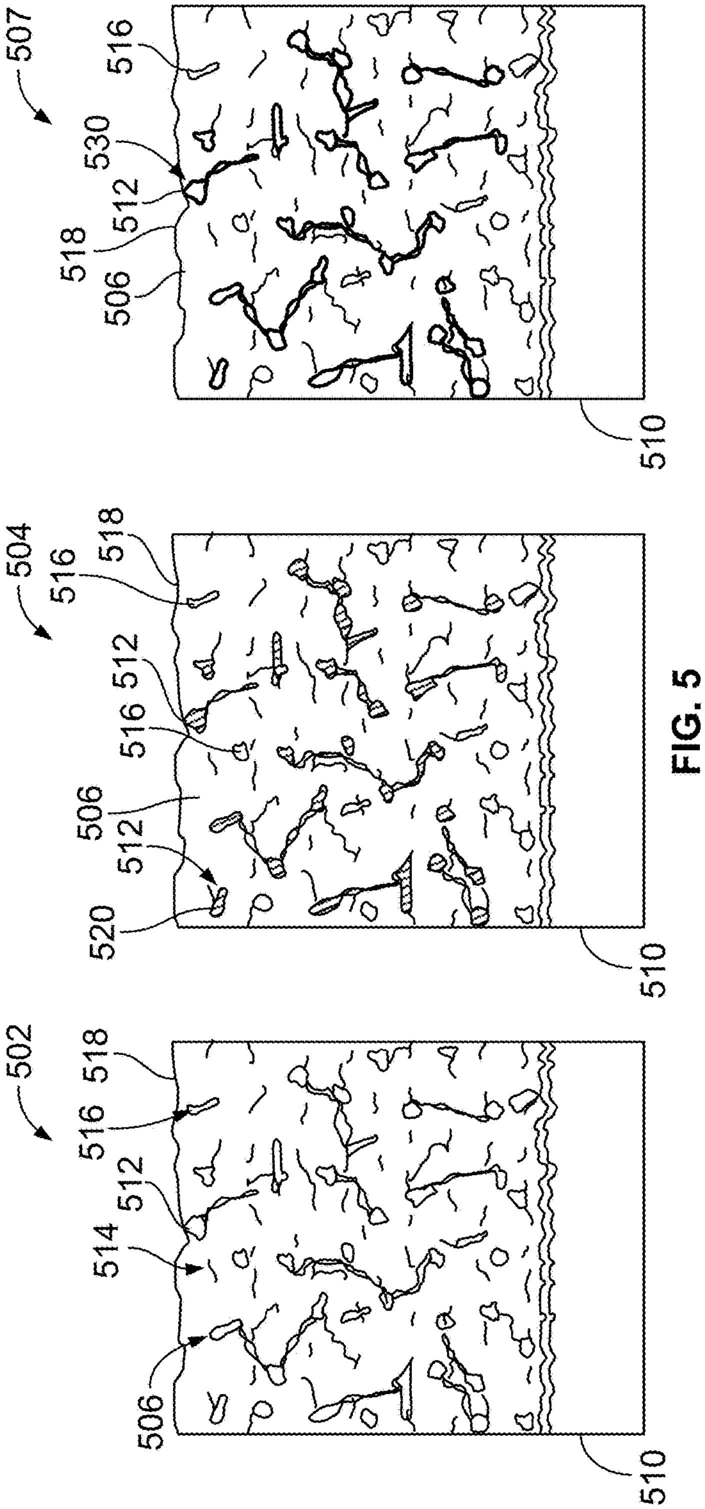
FIG. 5 illustrates an infiltration coating applied to a thermal barrier coating that has been applied via a plasma sprayed process in accordance with one embodiment.

FIG. 5 illustrates one embodiment of the infiltration coating 122 applied to a thermal barrier coating 506 that has been applied via a plasma sprayed process. Unlike the embodiment illustrated in FIG. 4, the thermal barrier coating 506 that is applied via the plasma spray process, such as the air plasma spray process, which has a random porosity structure instead of the columnar architecture structure. At 502, the thermal barrier coating 506 disposed on an article 510 includes plural pores 512 and splat boundaries 514 that are randomly disposed throughout the bulk of the thermal barrier coating 506. Some pores 512 are connected with other pores 512 via one or more splat boundaries 514.

At 504, liquid solution 520 of the infiltration coating is applied onto the thermal barrier coating 506 and penetrates the thermal barrier coating 506 from a surface 518 of the thermal barrier coating 506 to a distance away from the surface 518. The liquid solution 520 infiltrates a portion of the porosity of the thermal barrier coating to change the porosity value of the thermal barrier coating 506. For example, the liquid solution 520 infiltrates the open pores 512 and the pores 512 that are connected via the splat boundaries 514 but does not infiltrate isolated pores 516. In one or more embodiments, the open pores 512 may account for about 30% of the porosity of the thermal barrier coating 506, and the isolated pores 516 may account for about 70% of the porosity of the thermal barrier coating 506. Optionally, the thermal barrier coating 506 may have a porosity of open pores 512 and isolated pores 516 of varying percentages of the porosity of the thermal barrier coating 506.

At 507, the liquid solution decomposes to form solid oxide particles 530 of the infiltration coating. The solid oxide particles 530 coat the open pores 512 and the splat boundaries 514. The solid oxide particles 530 change the porosity of the thermal barrier coating 506 relative to the porosity of the thermal barrier coating 506 changed by the liquid solution 520 of the infiltration coating. For example, the thermal barrier coating 506 has a first porosity value prior to the liquid solution 520 of the infiltration coating infiltrating the open pores 512. The liquid solution 520 reduces the porosity of the bulk of the thermal barrier coating 506 from the first porosity value to a second porosity value that is less than the first porosity value. Subsequently, decomposing the infiltration coating to the solid oxide particles 530 reduces the porosity of the bulk of the thermal barrier coating 506 from the second porosity value to a third porosity value that is less than the second porosity value. The steps 502, 504, 506 may be repeated any number of times with a number of infiltration spray cycles to increase the volume of the solid oxide particles 530 of the infiltration coating that is infiltrated into the open pores 512 of the thermal barrier coating 506.

Figure 6:
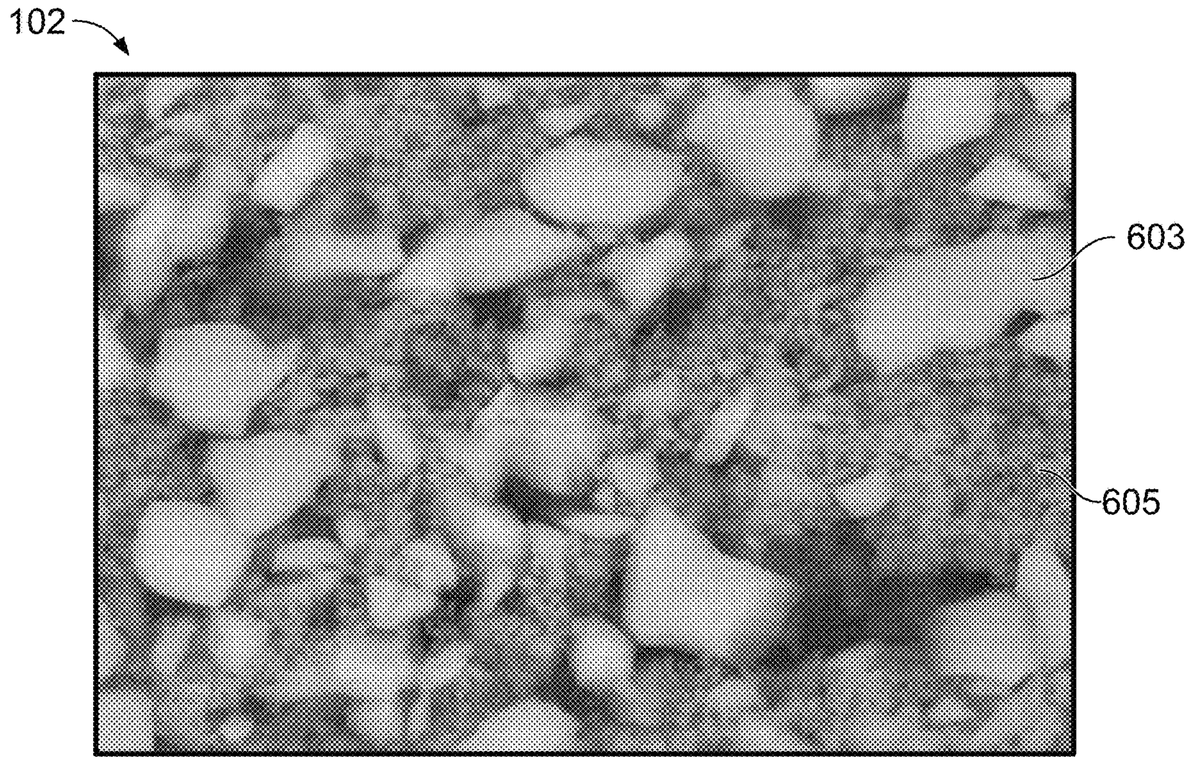
FIG. 6 illustrates a magnified view of the reactive phase spray formulation coating 100 in accordance with one embodiment.

FIG. 6 illustrates a magnified view of the reactive phase spray formulation coating 102 in accordance with one embodiment. The reactive phase spray formulation is applied onto the outer surface 108 and remains suspended on the outer surface 108 of the thermal barrier coating 106. For example, the infiltration coating 122 infiltrates the thermal barrier coating and becomes integral with the thermal barrier coating 106 after the infiltration coating 122 decomposes. The infiltration coating 122 treats the bulk 120 of the thermal barrier coating 106. Alternatively, the reactive phase spray formulation coating 102 remains on the surface of the thermal barrier coating 106 and treats the outer surface 108 of the thermal barrier coating 106.

The reactive phase spray formulation coating 102 includes a base material 603 that is combined with a binder material 605. In one embodiment, the reactive phase spray formulation coating 102 contains between 1% and 75% of the binder material 605, and the balance is the base material 603. In a preferred embodiment, the reactive phase spray formulation coating 102 contains between 3% and 50% of the binder material 605, and the balance is the base material 603. In an even more preferred embodiment, the reactive phase spray formulation coating 102 contains between 5% and 45% of the binder material 605, and the balance is the base material 603. Optionally, the reactive phase spray formulation coating 102 may contain the base material 603 and/or the binder material 605 with any alternative weight percentage.

In one or more embodiments, the base material 603 may be referred to herein as a base ceramic material. The base material 603 may be an earth oxide, such as, but not limited to, yttrium (Y), gadolinium (Gd), zirconium (Zr), oxygen (O), or the like. The base material 603 reacts with the CMAS in order to form or generate a melting point phases that is greater than a melting point phase of an alternative base material 603. For example, the reaction between the base material 603 and the CMAS may change the chemistry or chemical composition of the CMAS. In one embodiment, the base material 603 has a particle size of between less than 1 micron and 25 microns. In a preferred embodiment, the base material 603 has a particle size of between and including 1 micron and 10 microns. Optionally, the base material 603 may have an alternative particle size.

In one or more embodiments, the binder material 605 may also be referred to herein as a ceramic binder material, a ceramic powder binder, a ceramic binder, or the like. The binder material 605 has a chemical configuration that is similar to the chemical configuration of the base material 603. For example, the binder material 605 may be an earth oxide, such as, but not limited to, yttrium (Y), gadolinium (Gd), zirconium (Zr), oxygen (O), or the like. In one embodiment, the binder material 605 has a particle size that is between a size greater than 5 nanometers and 1 micron. In a preferred embodiment, the binder material 605 has a particle size that is greater than 5 nanometers and less than 1 micron. Optionally, the binder material 605 may have an alternative particle size. In one or more embodiments, the binder material 605 may have a morphology that is non-spherical, spherical, angular, or the like. In a preferred embodiment, the particles of the binder material 605 are not spherical.

In one embodiment, the binder material 605 has a surface area that is between 1 square-meters per gram (m2/g) and an infinite size. In a more preferred embodiment, the binder material 605 has a surface area that is between 5 m2/g and 10 m2/g. In an even more preferred embodiment, the binder material 605 has a surface area that at least 10 m2/g or greater (e.g., larger). Optionally, the binder material 605 may have an alternative surface area.

The surface area of the binder material 605 is greater than a surface area of the base material 603. Additionally, the binder material 605 has a cohesive strength that is greater than a cohesive strength of the base material 603. In one or more embodiments, the cohesive strength of the base material 603 may also be referred to herein as a base cohesive strength, and the cohesive strength of the binder material 605 may also be referred to herein as a binder cohesive strength. The larger surface area particles of the binder material 605 bond to the other larger diameter particles of the binder material 605. For example, the larger surface area of the particles of the binder material 605 improves a cohesive strength level of the reactive phase spray formulation coating 102 relative to the reactive phase spray formulation coating 102 not including the binder material 605. Additionally, the binder material 605 improves a cohesive strength level of the reactive phase spray formulation coating 102 on the thermal barrier coating 106 after thermal exposure of the reactive phase spray formulation coating 102, relative to the reactive phase spray formulation coating 102 that does not include the binder material 605.

The particle size of the binder material 605 is less than the particle size of the base material 603. Additionally, the binder material 605 has an adhesive strength that the greater than an adhesive strength of the base material 603. For example, the smaller particle size of the binder material 605 improves an adhesive strength level of the reactive phase spray formulation coating 102 relative to the reactive phase spray formulation coating 102 not including the binder material 605. In one or more embodiments, the adhesive strength of the base material 603 may also be referred to herein as a base adhesive strength, and the adhesive strength of the binder material 605 may also be referred to herein as a binder adhesive strength. The smaller particle size and the larger surface area of the binder material 605, relative to the base material 603, improves the adhesion of the reactive phase spray formulation coating 102 to the thermal barrier coating 106 relative to the reactive phase spray formulation coating 102 not including the binder material 605. Additionally, the binder material 605 improves an adhesive strength level of the reactive phase spray formulation coating 102 on the thermal barrier coating 106 after thermal exposure of the reactive phase spray formulation coating 102, relative to the reactive phase spray formulation coating 102 that does not include the binder material 605.

In one embodiment, the inventors found that the binder material 605 unexpectedly improves the adhesive strength level of the reactive phase spray formulation coating 102 to the thermal barrier coating, and improves the cohesive strength level of the reactive phase spray formulation coating 102 without a thermal treatment, thermal process, or the like, relative to the reactive phase spray formulation coating 102 that does not include the binder material 605. For example, the large surface energy component of the large surface area of the binder particles (e.g., relative to the small surface area of the base particles) drives a low temperature sintering and/or bonding of the binder particles to adjacent surfaces. The low temperature sintering improves the cohesive strength level of the reactive phase spray formulation coating 102 and improves the adhesive strength level of the reactive phase spray formulation coating 102 to the thermal barrier coating 106 relative to the reactive phase spray formulation coating 102 that does not include the binder material 605. In one or more embodiments, the reactive phase spray formulation coating 102 may be applied, deposited, or the like, onto the thermal barrier coating 106 with a cold and/or non-thermal process such as, but not limited to, a spray process, a slurry process, or the like.

The base material 603 has a chemical configuration that is similar to the chemical configuration of the binder material 605. For example, the base material 603 and the binder material 605 may both have a chemical configuration that includes a Zirconia-yttria formulation. In one embodiment, the base material 603 may have a Zirconia −55% yttria formulation (55YSZ), and the binder material 605 may have a Zirconia −8% yttria formulation (8YSZ), a Zirconia −20% yttria formulation (20YSZ), or any alternative Zirconia-yttria formulation. Optionally, the base material 603 and the binder material 605 may have an alternative chemical formulation comprising one or more of an alpha aluminum oxide formulation, silicone-dioxide, CMAS, strontium aluminum garnet (SAG), gallium alumina perovskite (GAP), gadolinia zirconia (GdZr), or the like.

In one embodiment, the reactive phase spray formulation coating 102 may include the base material 603 that has a chemical configuration of about 70 grams of 55YSZ with a median particle size less that is than 10 microns and a surface area between 1 m2/g and 2 m2/g. The base material 603 may be combined with the binder material 605 having a chemical configuration of about 30 grams of 8YSZ with a median particle size that is less than 1 micron and a surface area that is greater than 15 m2/g. The reactive phase spray formulation coating 102 has a ratio having at least seven parts of the base material 603 to at least three parts of the binder material 605. For example, the reactive phase spray formulation coating 102 may contain about 45% of the binder material 605, with the balance being the base material 603. The reactive phase spray formulation coating 102 that is applied onto the thermal barrier coating 106 may have a thickness of about 5 microns, about 10 microns, about 12 microns, about 15 microns, or the like. Optionally, the reactive phase spray formulation coating 102 may include a different amount of the base material 603 and/or the binder material 605, the base material 603 and/or the binder material 605 may have an alternative particle size, surface area, chemical configuration, or any alternative combination therein.

In one embodiment, the reactive phase spray formulation coating 102 may include the base material 603 that has a chemical configuration of about 95 grams of 55YSZ with a median particle size less that is than 10 microns and a surface area between 1 m2/g and 2 m2/g. The base material 603 may be combined with the binder material 605 having a chemical configuration of about 5 grams of 8YSZ with a median particle size that is less than 1 micron and a surface area that is greater than 15 m2/g. The reactive phase spray formulation coating 102 has a ratio having at least nineteen parts of the base material 603 to at least one part of the binder material 605. For example, the reactive phase spray formulation coating 102 may contain about 5% of the binder material 605, with the balance being the base material 603. The reactive phase spray formulation coating 102 that is applied onto the thermal barrier coating 106 may have a thickness of about 5 microns, about 10 microns, about 12 microns, about 15 microns, or the like. Optionally, the reactive phase spray formulation coating 102 may include a different amount of the base material 603 and/or the binder material 605, the base material 603 and/or the binder material 605 may have an alternative particle size, surface area, chemical configuration, or any alternative combination therein.

In one embodiment, the reactive phase spray formulation coating 102 may include the base material 603 that has a chemical configuration of 100 grams of pseudo-boehmite that is calcined in air to form aluminum oxide ($Al_2O_3$) with a surface area that is about 50 m2/g. The base material 603 may be combined with the binder material 605 that has a chemical configuration of about 100 grams of $Al_2O_3$ with a median particle size that is less than 1 micron. The reactive phase spray formulation coating 102 that is applied onto the thermal barrier coating 106 may have a thickness of about 5 microns, about 10 microns, about 12 microns, about 15 microns, or the like.

The base material 603 has a compliance that is higher than a compliance of the binder material 605. For example, the base material 603 has a modulus of elasticity and a stiffness that is less than a modulus of elasticity and a stiffness of the binder material 605. In one or more embodiments, the compliance of the base material 603 may also be referred to herein as a base compliance, and the compliance of the binder material 605 may also be referred to herein as a binder compliance. The reactive phase spray formulation coating 102 remains substantially compliant responsive to application of the formulation coating 102 onto the thermal barrier coating 106, thermal exposure responsive to operation of the turbine engine, and a reaction with the dust deposits 104 deposited on the thermal barrier coating 106. In one or more embodiments, the reactive phase spray formulation coating 102 has an in-plane modulus of elasticity less than 100 gigapascal (GPa). In a preferred embodiment, the reactive phase spray formulation coating 102 has an in-plane modulus of elasticity less than 80 GPa. In an even more preferred embodiment, the reactive phase spray formulation coating 102 has an in-plane modulus of elasticity less than 60 GPa. For example, a reactive phase spray formulation coating 102 with an in-plane modulus of elasticity that is greater than 60 GPa may cause spallation of the reactive phase spray formulation coating 102 responsive to a reaction with the dust deposits 104 during thermal cycling of the turbine engine.

The reactive phase spray formulation coating 102, that is created or formed by the reaction of the larger particle size of the base material (e.g., greater than 1 micron) with the binder material 605 in the formulation coating 102, and the dust deposits 104 that are incident on the thermal barrier coating 106, need to be compliant such that upon thermal cycling of the turbine engine, the cyclic strains do not generate spallation of the formulation coating 102. Responsive to thermal exposure of the spray formulation coating 102 by operation of the turbine engine, the larger base material 603 particles are affected less than the smaller binder material 605 particles that experience morphological changes, coarsening, or the like, during the thermal cycling. The compliance of the base material 603 substantially maintains the in-plane modulus of elasticity of the reactive phase spray formulation coating 102 at less than 60 GPa.

In one or more embodiments, the coating system 100 may include the infiltration coating 122 and a reactive phase spray formulation coating that includes a base material but does not include a binder material. For example, the base material of the reactive phase spray formulation coating may react with the dust or CMAS on the thermal barrier coating 106.

In one embodiment, the inventors found that the coating system 100 including the combination of the infiltration coating 122 with the reactive phase spray formulation coating 102 unexpectedly improves the reduction of spallation of the thermal barrier coating caused by dust and/or CMAS relative to infiltration coating 122 and/or the reactive phase spray formulation coating 102 not being deposited on the thermal barrier coating 106.

Figure 7:
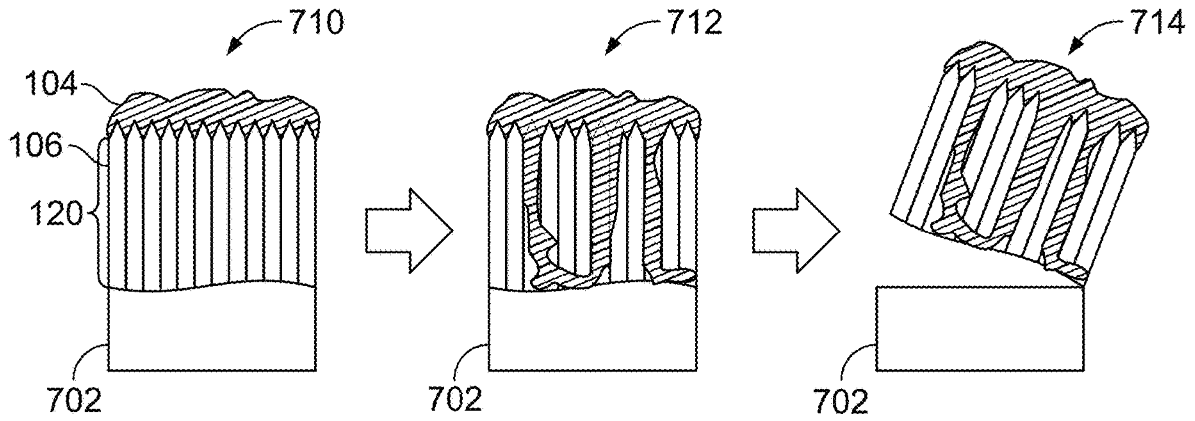
FIG. 7 illustrates a known reaction of a thermal barrier coating applied to an article.

FIG. 7 illustrates a known reaction of the thermal barrier coating 106 applied to an article 702. In one or more embodiments, the article 702 may be a surface of a turbine engine, a surface of one or more components of the turbine engine such as a turbine blade or airfoil, or the like. The bulk 120 of the thermal barrier coating 106 is deposited onto the article 702 and extends a distance away from the article 702. At 710, a layer of the dust deposits 104 is disposed on the thermal barrier coating 106. For example, responsive to the turbine engine operating during a test cycle, operating cycle, or the like, dust deposits may collect, form, or the like, on one or more surfaces of the turbine engine on the thermal barrier coating 106.

At 712, the dust deposits 104 and/or CMAS deposits infiltrate the thermal barrier coating 106 during service or operation of the turbine engine. For example, the thermal barrier coating 106 begins to degrade and the dust deposits 104 begin to move into and/or through thermal barrier coating 106. The dust deposits 104 that infiltrate the thermal barrier coating 106 compromise the stability of the thermal barrier coating 106. At 714, the thermal barrier coating 106 begins to spall responsive to the dust deposits 104 and/or CMAS build up and infiltration. The spallation of the thermal barrier coating 106 exposes the article 702 at the location of the spallation such that the article 702 may be damaged at the location of the spallation.

Figure 8:
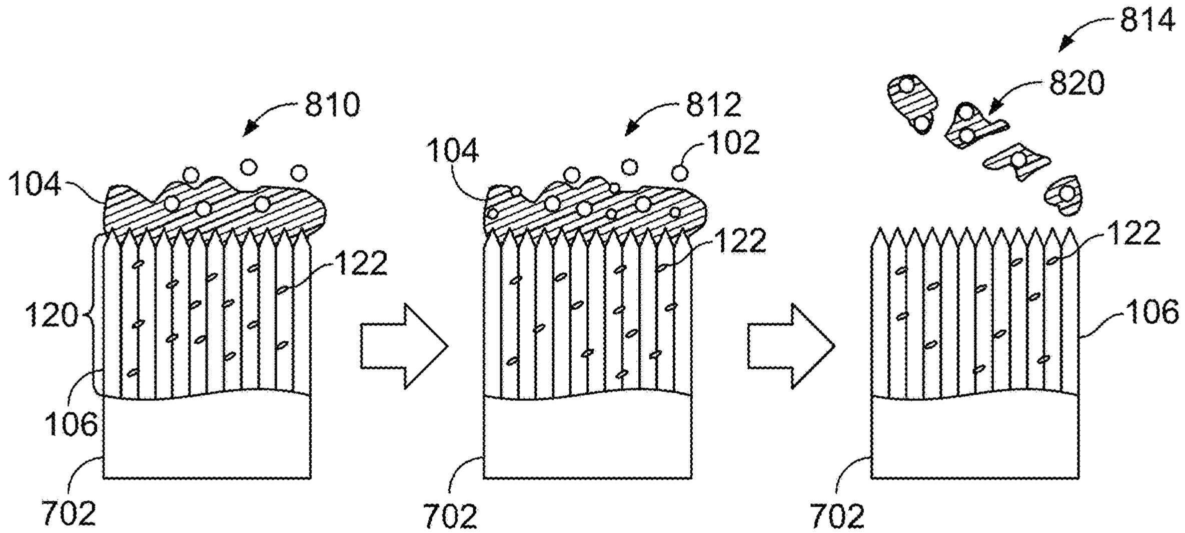
FIG. 8 illustrates a reaction of a thermal barrier coating and a coating system applied to an article in accordance with one embodiment.

Alternatively, FIG. 8 illustrates a reaction of the thermal barrier coating 106 and the coating system 100 applied to the article 702 in accordance with one embodiment. In the illustrated embodiment at 810, the liquid solution of the infiltration coating 122 is applied to, deposited onto, sprayed onto, or the like, the layer of the dust deposits 104 that have formed on the thermal barrier coating 106. Optionally, the infiltration coating 122 may be applied directly onto the thermal barrier coating 106. For example, the outer surface may not have a layer of dust and/or CMAS. In one or more embodiments, the infiltration coating 122 may be applied to the thermal barrier coating 106 in plural coating applications. The liquid solution of the infiltration coating 122 penetrates the thermal barrier coating 106 between the thermal barrier coating 106 and the article 702. The liquid solution of the infiltration coating 122 fills a portion of the pores of the thermal barrier coating 106. Subsequently, the infiltration coating 122 decomposes (e.g., by the application of heat) and the infiltration coating 122 changes from the liquid solution to the solid oxide particles that coat the pores of the thermal barrier coating 106.

At 812, after the infiltration coating 122 has decomposed within the thermal barrier coating 106, the reactive phase spray formulation coating 102 is applied to, deposited onto, sprayed onto, or the like, the layer of the dust deposits 104. The reactive phase spray formulation coating 102 (e.g., comprising the base and binder materials 603, 605, respectively), remain suspended on the top of the thermal barrier coating 106. For example, the infiltration coating 122 treats the bulk 120 of the thermal barrier coating 106 and the reactive phase spray formulation coating 102 treats the surface of the thermal barrier coating 106.

At 814, during or responsive to the turbine engine operating during a test cycle, operating cycle, or the like, the reactive phase spray formulation coating 102 reacts with the dust deposits 104 and/or CMAS deposits. The reaction between the formulation coating 102 and the CMAS deposits raises the fusion temperature of the CMAS deposits. As a result of the reaction between the formulation coating 102 and the dust deposits 104, reactive debris 820 of the formulation coating 102 and the dust deposits 104 flake off or fall off of the thermal barrier coating 106 and does not infiltrate the thermal barrier coating 106. Additionally, the infiltration coating 122 maintains the integrity of the thermal barrier coating 106 at the location where the dust deposits have fallen off from the surface of the thermal barrier coating 106. The coating system 100 including the infiltration coating 122 and the reactive phase spray formulation coating 102 reduces an amount of spalling of the thermal barrier coating 106 due to dust and/or CMAS relative to the coating system 100 not including one of the infiltration coating 122 or the reactive phase spray formulation coating 102.

Figure 9:
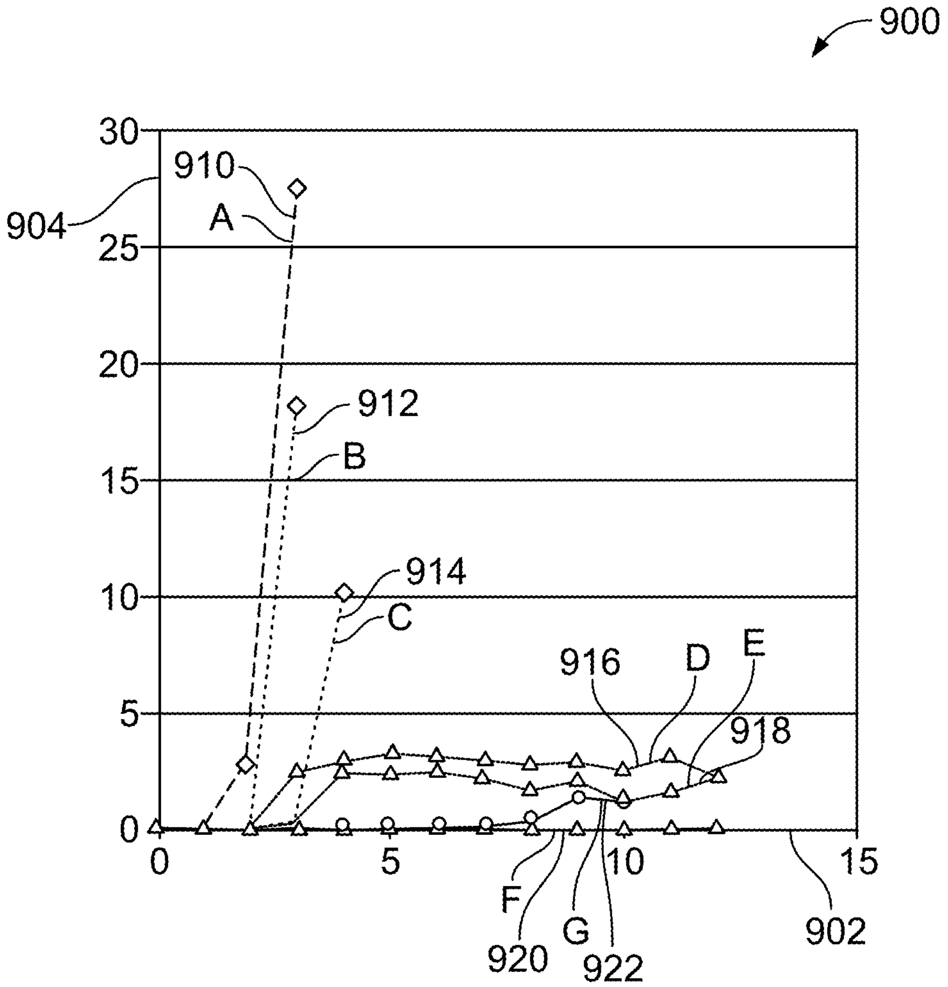
FIG. 9 illustrates a graph of results from a jet engine thermal shock (JETS) test, in accordance with one embodiment.

FIG. 9 illustrates a graph 900 of results from a jet engine thermal shock (JETS) test. Test coupons were tested to evaluate the ability to withstand multiple thermal shocks at temperatures in the presence of atmospheric dust as represented by standard CMAS dust. The JETS test employs a temperature gradient across the thickness of each of the test coupons. The temperature gradients employed may be representative of the temperature gradients during operation of the engine. For example, the thermal shock testing in the presence of the CMAS dust simulates the thermal cycling and environmental dust exposure that components experience in the turbine section of an aircraft engine in general operation of the aircraft. In one or more embodiments, the nominal CMAS may have a following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the CMAS reactivity of the substance in a way that can be compared to the CMAS reactivity of other substances. Use of this reference composition does not limit the actual composition of ingested material that may become deposited on the coating during operation of the engine.

A horizontal axis 902 represents increasing numbers of thermal shock tests. A vertical axis 904 represents increasing volume of spallation. The graph includes plural data lines 910, 912, 914, 916, 918, 920, 922 that represent each of the different test coupons tested. A first data line 910 represents a baseline sample A that includes an article having a layer of thermal barrier coating deposited onto the article. A second data line 912 and a third data line 914 represent samples B and C, respectively, that each include an article with a thermal barrier coating, and a reactive phase spray formulation coating applied to each of the samples B and C. For example, the samples B and C do not include the infiltration coating. A fourth data line 916 and a fifth data line 918 represent samples D and E, respectively, that each include an article with a thermal barrier coating, and the infiltration coating applied to each of the samples D and E. For example, the samples D and E do not include the reactive phase spray formulation coating. A sixth data line 920 and a seventh data line 922 represent samples F and G, respectively, that each include an article with a thermal barrier coating and the coating system (e.g., the infiltration coating and the reactive phase spray formulation coating). Each of the coupons represented by each of the data lines 910-922 were JETS tested as described above. The results of the graph 900 show that the samples F and G with the coating system (e.g., the infiltration coating and the reactive phase spray formulation coating) survived significantly better than the test samples without one of the infiltration coating or the reactive phase spray formulation coating (e.g., samples B, C, D, and E), and significantly better than the baseline sample without the coating system (e.g., sample A).

In one or more embodiments, the coating system 100 may be applied on the thermal barrier coating of a new part (e.g., a new component of a turbine engine), the coating system 100 may be applied on the thermal barrier coating of a repaired part (e.g., an existing and/or used component of the turbine engine), may be applied on the new and/or repaired part in the field or at a maintenance location, or the like. For example, the coating system 100 having a first formulation may be applied to a new part, and the coating system 100 having a different, second formulation may be applied to an existing part in order to repair or restore the thermal barrier coating of the existing part. The first formulation may have a chemical composition that is different than a chemical composition of the second formulation such that the second formulation is tailored or specifically configured to restore the thermal barrier coating of the existing part. Optionally, the first formulation may include a first volume of the infiltration coating and a first volume of the reactive phase spray formulation coating that is different than a second volume of the infiltration coating and/or a second volume of the reactive phase spray formulation coating of the second formulation.

The order of application steps of applying the coating system 100 may vary based on one or more factors. As previously set forth, the coating system 100 may include the application of the infiltration coating 122 followed by the application of the reactive phase spray formulation coating 102. In one embodiment, the infiltration coating 122 then the reactive phase spray formulation coating 102 may be applied to a new component, a new piece part, an existing piece part, component level repair, or the like. In one or more alternative embodiments, the reactive phase spray formulation coating 102 then the infiltration coating 122 may be applied to the new component, the new piece part, the existing piece part, component level repair, or the like. The component level repair may be completed in the field, in a maintenance facility, or the like. Optionally, the component level repair may be completed without disassembling the system (e.g., the turbine engine) or may require disassembly of the system.

In one or more embodiments, the article may include a layer of the reactive phase spray formulation coating 102 applied onto the thermal barrier coating 106. The article may require maintenance which may include applying the infiltration coating 122 then applying the reactive phase spray formulation coating 102 at an overhaul shop for module level repair. Optionally, the infiltration coating 122 then the reactive phase spray formulation coating 102 may be applied as piece part repair with or without removal of the thermal barrier coating 102, may be applied as component level repair in the field or at the overhaul shop, or the like.

In one or more embodiments, the new article or new component may include deposition of the infiltration coating 122 then the reactive phase spray formulation coating 102. The article may require maintenance which may only require applying the infiltration coating 122 at an overhaul or maintenance facility, as module level repair in the field without disassembling the system, or the like. In another embodiment, the article may require maintenance which may require applying the infiltration coating 122 then the reactive phase spray formulation coating 102 at the overhaul or maintenance facility, in the field as module level repair, or the like. In another embodiment, the article may require maintenance which may require applying the infiltration coating 122 then the reactive phase spray formulation coating 102 at the piece part after removal of the thermal barrier coating 106 as component level repair.

In one or more embodiments, the coating system 100 may be applied in the field (e.g., outside of a maintenance facility) as on wing repair, for example, on the wing of an aircraft. The infiltration coating 122 then the reactive phase spray formulation coating 102 may be applied to one or more surfaces of the wing, the reactive phase spray formulation coating 102 then the infiltration coating 122 may be applied, only the infiltration coating 122 may be applied, or any combination therein. Optionally, the coating system 100, or one or more components of the coating system 100, may be applied onto the article in any order or combination as a new component, as maintenance to the article, or the like.

In one embodiment of the subject matter described herein, a method includes applying an infiltration coating on a thermal barrier coating of an article. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The method also includes applying a reactive phase spray formulation coating on the thermal barrier coating. The reactive phase spray formulation coating reacts with dust deposits on the thermal barrier coating.

Optionally, the infiltration coating penetrates the thermal barrier coating from a surface of the thermal barrier coating to a distance away from the surface of the thermal barrier coating.

Optionally, the infiltration coating is integral with the thermal barrier coating after the infiltration coating decomposes within the at least some pores of the thermal barrier coating.

Optionally, a bulk of the thermal barrier coating has a porosity having a first porosity value. The infiltration coating is configured to infiltrate the at least some pores of the thermal barrier coating to reduce the porosity of the bulk of the thermal barrier coating from the first porosity value to a second porosity value that is less than the first porosity value.

Optionally, decomposing the infiltration coating within the at least some pores of the thermal barrier coating reduces the porosity of the bulk of the thermal barrier coating from the second porosity value to a third porosity value that is less than the second porosity value.

Optionally, the infiltration coating is configured to decompose by heating the infiltration coating. Heating the infiltration coating changes the infiltration coating from a liquid solution to solid oxide particles.

Optionally, the liquid solution of the infiltration coating is configured to fill a portion of the at least some pores of the thermal barrier coating. The solid oxide particles of the decomposed infiltration coating are configured to fill a portion of the at least some of the pores of the thermal barrier coating that is less than the portion filled by the liquid solution of the infiltration coating.

Optionally, the reactive phase spray formulation coating remains on a surface of the thermal barrier coating.

Optionally, the infiltration coating and the reactive phase spray formulation coating are configured to reduce an amount of spalling of the thermal barrier coating relative to one or more of the infiltration coating or the reactive phase spray formulation coating not being applied to the thermal barrier coating.

Optionally, the reactive phase spray formulation coating includes a base material and a binder material.

Optionally, the base material has a compliance that is higher than a compliance of the binder material, the binder material has a cohesive strength that is greater than a cohesive strength of the base material, the binder material has an adhesive strength that is greater than an adhesive strength of the base material, and the binder material has a surface area of at least ten square meters per gram that is greater than a surface area of the base material.

Optionally, the article is a surface of a turbine assembly.

Optionally, the infiltration coating is configured to be applied to the thermal barrier coating by plural coating applications.

Optionally, the infiltration coating and the reactive phase spray formulation coating are configured to be applied to the thermal barrier coating in a non-thermal process.

Optionally, the thermal barrier coating is configured to be deposited on the article via an electron beam-physical vapor deposition process, a physical vapor deposition process, an air plasma spray process, a directed vapor deposition process, or a suspension plasma spray process.

Optionally, the thermal barrier coating deposited via the electron beam-physical vapor deposition process is configured to have a porosity structure that is different than a porosity structure of the thermal barrier coating deposited via one or more of the physical vapor deposition process, the air plasma spray process, the directed vapor deposition process, or the suspension plasma spray process.

In one embodiment of the subject matter described herein, a coating system configured to be applied to a thermal barrier coating of an article includes an infiltration coating configured to be applied to the thermal barrier coating. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The coating system also includes a reactive phase spray formulation coat configured to be applied to the thermal barrier coating. The reactive phase spray formulation coating reacts with dust deposits on the thermal barrier coating.

Optionally, the infiltration coating and the reactive phase spray formulation coating are configured to reduce an amount of spalling of the thermal barrier coating relative to one or more of the infiltration coating or the reactive phase spray formulation coating not being applied to the thermal barrier coating.

Optionally, the infiltration coating is integral with the thermal barrier coating after the infiltration coating decomposes within the at least some pores of the thermal barrier coating.

Optionally, the infiltration coating is configured to decompose by heating the infiltration coating, wherein heating the infiltration coating changes the infiltration coating from a liquid solution to solid oxide particles.

Optionally, the liquid solution of the infiltration coating is configured to fill a portion of the at least some of the pores of the thermal barrier coating, and wherein the solid oxide particles of the decomposed infiltration coating are configured to fill a portion of the at least some of the pores of the thermal barrier coating that is less than the portion filled by the liquid solution of the infiltration coating.

Optionally, a bulk of the thermal barrier coating has a porosity having a first porosity value, wherein the infiltration coating is configured to infiltrate the at least some pores of the thermal barrier coating to reduce the porosity of the bulk of the thermal barrier coating from the first porosity value to a second porosity value that is less than the first porosity value.

Optionally, decomposing the infiltration coating within the at least some pores of the thermal barrier coating reduces the porosity of the bulk of the thermal barrier coating from the second porosity value to a third porosity value that is less than the second porosity value.

Optionally, the infiltration coating is configured to penetrate the thermal barrier coating from a surface of the thermal barrier coating to a distance away from the surface of the thermal barrier coating.

Optionally, the reactive phase spray formulation coating is configured to remain on a surface of the thermal barrier coating.

Optionally, the reactive phase spray formulation coating comprises a base material and a binder material.

Optionally, the base material has a compliance that is higher than a compliance of the binder material, the binder material has a cohesive strength that is greater than a cohesive strength of the base material, the binder material has an adhesive strength that is greater than an adhesive strength of the base material, and the binder material has a surface area of at least ten square meters per gram that is greater than a surface area of the base material.

Optionally, the article is a surface of a turbine assembly.

Optionally, the infiltration coating is configured to be applied to the thermal barrier coating by plural coating applications.

Optionally, the infiltration coating and the reactive phase spray formulation coating are configured to be applied to the thermal barrier coating in a non-thermal process.

Optionally, the thermal barrier coating is configured to be deposited on the article via an electron beam-physical vapor deposition process, a physical vapor deposition process, an air plasma spray process, a directed vapor deposition process, or a suspension plasma spray process.

Optionally, the thermal barrier coating deposited via the electron beam-physical vapor deposition process is configured to have a porosity structure that is different than a porosity structure of the thermal barrier coating deposited via one or more of the physical vapor deposition process, the air plasma spray process, the directed vapor deposition process, or the suspension plasma spray process.

In one embodiment of the subject matter described herein, a method includes depositing an infiltration coating on a thermal barrier coating of an article. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The method also includes depositing a reactive phase spray formulation coating on the thermal barrier coating. The reactive phase spray formulation coating includes a base material and a binder material. The base material has a compliance that is higher than a compliance of the binder material. The binder material has a cohesive strength that is greater than a cohesive strength of the base material. The binder material has an adhesive strength that is greater than an adhesive strength of the base material. The binder material has a surface area of at least ten square meters per gram that is greater than a surface area of the base material. The infiltration coating and the reactive phase spray formulation coating are configured to reduce an amount of spalling of the thermal barrier coating relative to one or more of the infiltration coating or the reactive phase spray formulation coating not being deposited on the thermal barrier coating.

Optionally, the reactive phase spray formulation coating is configured to remain on the surface of the thermal barrier coating.

Optionally, the infiltration coating is configured to be deposited on the thermal barrier coating by plural coating applications.

Optionally, a bulk of the thermal barrier coating has a porosity having a first porosity value, wherein infiltrating the at least some of the pores of the thermal barrier coating reduces the porosity of the thermal barrier coating to a second porosity value that is less than the first porosity value, and wherein coating the portion of the at least some pores of the thermal barrier coating reduces the porosity of the thermal barrier coating to a third porosity value that is less than the second porosity value.

In one embodiment of the subject matter described herein, a system includes an article including a thermal barrier coating and a coating system deposited on the thermal barrier coating of the article. The coating system includes an infiltration coating configured to be deposited on the thermal barrier coating. The infiltration coating infiltrates at least some pores of the thermal barrier coating. The infiltration coating decomposes within the at least some pores of the thermal barrier coating to coat a portion of the at least some pores of the thermal barrier coating. The infiltration coating reduces a porosity of the thermal barrier coating. The coating system also includes a reactive phase spray formulation coating configured to be deposited on the thermal barrier coating. The reactive phase spray formulation coating reacts with dust deposits on the thermal barrier coating. The infiltration coating and the reactive phase spray formulation coating are configured to reduce an amount of spalling of the thermal barrier coating relative to one or more of the infiltration coating or the reactive phase spray formulation coating not being deposited on the thermal barrier coating.

As used herein, an element or step recited in the singular and proceeded with the word “a” or “an” should be understood as not excluding plural of said elements or steps, unless such exclusion is explicitly stated. Furthermore, references to “one embodiment” of the presently described subject matter are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An article, comprising:

a component having a thermal barrier coating on a surface thereof; and an infiltration coating within the thermal barrier coating, the infiltration coating comprising solid oxide particles coating a portion of at least some internal pores of the thermal barrier coating, wherein the solid oxide particles are a thermal decomposition product of a liquid solution of a nitrate of one or more of aluminum, gadolinium, yttrium, or strontium; and a reactive coating on the surface of the thermal barrier coating for reacting with dust deposits on the thermal barrier coating during use of the article, wherein the reactive coating is formed from a phase spray formulation that includes a base ceramic material and a ceramic binder material, wherein each of the base ceramic material and ceramic binder material comprises an earth oxide comprising yttrium, gadolinium, or zirconium, wherein the base ceramic material has a particle size between 1 and 10 μm, wherein the ceramic binder material has a particle size that is less than 1 μm.

2. The article of claim 1, wherein the infiltration coating is integral with the thermal barrier coating.

3. The article of claim 1, wherein the infiltration coating is configured to decompose by heating the infiltration coating, wherein heating the infiltration coating changes the infiltration coating from a liquid solution to solid oxide particles.

4. The article of claim 3, wherein the liquid solution of the infiltration coating is configured to fill a portion of the at least some internal pores of the thermal barrier coating, and wherein the solid oxide particles of the decomposed infiltration coating are configured to fill a portion of the at least some internal pores of the thermal barrier coating that is less than the portion filled by the liquid solution of the infiltration coating.

5. The article of claim 1, wherein a bulk of the thermal barrier coating has a porosity having a first porosity value, wherein the infiltration coating is configured to infiltrate the at least some internal pores of the thermal barrier coating to reduce the porosity of the bulk of the thermal barrier coating from the first porosity value to a second porosity value that is less than the first porosity value.

6. The article of claim 5, wherein decomposing the infiltration coating within the at least some internal pores of the thermal barrier coating reduces the porosity of the bulk of the thermal barrier coating from the second porosity value to a third porosity value that is less than the second porosity value.

7. The article of claim 1, wherein the infiltration coating is configured to penetrate the thermal barrier coating from a surface of the thermal barrier coating to a distance away from the surface of the thermal barrier coating.

8. The article of claim 1, wherein the reactive coating is configured to remain on a surface of the thermal barrier coating.

9. The article of claim 1, wherein the ceramic binder material has an adhesive strength that is greater than an adhesive strength of the base ceramic material, and the ceramic binder material has a surface area of at least ten square meters per gram that is greater than a surface area of the base ceramic material.

10. The article of claim 1, wherein the article is a surface of a turbine assembly.

11. The article of claim 1, wherein the infiltration coating is configured to be applied to the thermal barrier coating by plural coating applications.

12. The article of claim 1, wherein the infiltration coating and the reactive coating are configured to be applied to the thermal barrier coating in a non-thermal process.

13. The article of claim 1, wherein the thermal barrier coating is configured to be deposited on the article via an electron beam-physical vapor deposition process, a physical vapor deposition process, an air plasma spray process, a directed vapor deposition process, or a suspension plasma spray process.

14. The article of claim 13, wherein the thermal barrier coating deposited via the electron beam-physical vapor deposition process is configured to have a porosity structure that is different than a porosity structure of the thermal barrier coating deposited via one or more of the air plasma spray process, the directed vapor deposition process, or the suspension plasma spray process.

* * * * *